United States Patent
Singleton, IV

(10) Patent No.: US 10,348,837 B2
(45) Date of Patent: Jul. 9, 2019

(54) METHODS AND SYSTEMS FOR CONNECTING DEVICES TO APPLICATIONS AND DESKTOPS THAT ARE RECEIVING MAINTENANCE

(71) Applicant: Citrix Systems, Inc., Fort Lauderdale, FL (US)

(72) Inventor: Leo C. Singleton, IV, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 261 days.

(21) Appl. No.: 14/571,342

(22) Filed: Dec. 16, 2014

(65) Prior Publication Data

US 2016/0173619 A1    Jun. 16, 2016

(51) Int. Cl.
*H04L 29/08* (2006.01)
*H04L 29/06* (2006.01)
*G06F 11/36* (2006.01)

(52) U.S. Cl.
CPC .......... *H04L 67/16* (2013.01); *H04L 67/1002* (2013.01); *H04L 67/1034* (2013.01); *H04L 67/42* (2013.01); *G06F 11/3664* (2013.01); *H04L 67/08* (2013.01)

(58) Field of Classification Search
CPC ..... H04L 67/16; H04L 67/42; H04L 67/1002; H04L 67/1034; H04L 67/08; G06F 11/1415; G06F 11/1464; G06F 11/3664
See application file for complete search history.

(56) References Cited

U.S. PATENT DOCUMENTS

| | | | | |
|---|---|---|---|---|
| 5,951,697 A | * | 9/1999 | O'Donnell | G06F 11/2242 709/220 |
| 6,891,802 B1 | * | 5/2005 | Hubbard | H04L 41/5038 370/241 |
| 7,447,854 B1 | * | 11/2008 | Cannon | G06F 11/1451 711/162 |
| 8,788,685 B1 | * | 7/2014 | Boyles | G06F 11/3688 709/217 |
| 9,396,160 B1 | * | 7/2016 | Aithal | G06F 11/3668 |
| 9,436,725 B1 | * | 9/2016 | Aithal | G06F 11/00 |

(Continued)

OTHER PUBLICATIONS

International Search Report and Written Opinion for PCT Application No. PCT/US2015/014323 dated May 29, 2015, 16 pages.

*Primary Examiner* — Philip J Chea
*Assistant Examiner* — Wuji Chen
(74) *Attorney, Agent, or Firm* — Foley & Lardner LLP; Christopher J. McKenna

(57) ABSTRACT

The embodiments are directed to methods and systems for determining whether a server should be placed in maintenance mode. The methods and systems can create a user group comprising one or more client devices connected to one or more permanently installed applications or one or more virtual desktops hosted on the server. The methods and systems can create a temporary directory containing duplicates of the one or more applications or one or more virtual desktops that the one or more client devices are connected to. The methods and systems can disconnect the one or more client devices from the one or more permanent applications or virtual desktops, and connect the one or more user devices to the one or more duplicate applications or virtual desktops.

26 Claims, 5 Drawing Sheets

(56) References Cited

U.S. PATENT DOCUMENTS

| | | | | |
|---|---|---|---|---|
| 2002/0065795 A1* | 5/2002 | Asherman | G06F 17/30893 |
| 2003/0236880 A1* | 12/2003 | Srivastava | G06F 11/326 |
| | | | | 709/224 |
| 2004/0059735 A1* | 3/2004 | Gold | G06F 11/2025 |
| 2005/0086342 A1* | 4/2005 | Burt | H04L 41/0663 |
| | | | | 709/224 |
| 2006/0015645 A1* | 1/2006 | Ocko | H04L 67/2861 |
| | | | | 709/238 |
| 2006/0218279 A1* | 9/2006 | Yamaguchi | H04L 67/1008 |
| | | | | 709/226 |
| 2007/0083630 A1* | 4/2007 | Roth | G06F 11/3688 |
| | | | | 709/223 |
| 2007/0083634 A1* | 4/2007 | Roth | G06F 11/3688 |
| | | | | 709/223 |
| 2007/0083793 A1* | 4/2007 | Roth | G06F 11/3414 |
| | | | | 714/25 |
| 2007/0083794 A1* | 4/2007 | Yu | G06F 11/1438 |
| | | | | 714/38.13 |
| 2007/0174429 A1* | 7/2007 | Mazzaferri | G06F 3/1415 |
| | | | | 709/218 |
| 2008/0130639 A1* | 6/2008 | Costa-Requena | G06F 8/65 |
| | | | | 370/389 |
| 2008/0198742 A1* | 8/2008 | Kaempfer | H04L 43/50 |
| | | | | 370/230 |
| 2009/0006500 A1* | 1/2009 | Shiozawa | G06F 11/1662 |
| 2009/0113058 A1* | 4/2009 | Ou | H04L 12/5695 |
| | | | | 709/227 |
| 2009/0132857 A1* | 5/2009 | Tong | G06F 11/2294 |
| | | | | 714/27 |
| 2009/0199047 A1* | 8/2009 | Vaitheeswaran | G06F 11/3409 |
| | | | | 714/47.2 |
| 2010/0131946 A1 | 5/2010 | Degaonkar et al. |
| 2010/0157964 A1* | 6/2010 | Yoon | H04W 76/027 |
| | | | | 370/338 |
| 2012/0030513 A1* | 2/2012 | Peng | G06F 11/2097 |
| | | | | 714/37 |
| 2012/0102369 A1* | 4/2012 | Hiltunen | G06F 11/008 |
| | | | | 714/48 |
| 2012/0254300 A1* | 10/2012 | Rai | H04L 67/42 |
| | | | | 709/203 |
| 2012/0311375 A1* | 12/2012 | Shah | H04L 61/1511 |
| | | | | 714/4.11 |
| 2014/0079207 A1* | 3/2014 | Zhakov | H04M 3/5175 |
| | | | | 379/265.03 |
| 2014/0108775 A1 | 4/2014 | Kludy et al. |
| 2014/0189134 A1* | 7/2014 | Das | H04L 67/1097 |
| | | | | 709/227 |
| 2014/0337664 A1* | 11/2014 | Gokhale | G06F 11/1464 |
| | | | | 714/6.3 |
| 2014/0365827 A1* | 12/2014 | Arguelles | G06F 11/2635 |
| | | | | 714/27 |
| 2016/0105504 A1* | 4/2016 | Vallabhaneni | H04L 67/1095 |
| | | | | 709/217 |

* cited by examiner

METHODS AND SYSTEMS FOR CONNECTING DEVICES TO APPLICATIONS AND DESKTOPS THAT ARE RECEIVING MAINTENANCE

BACKGROUND

Computer programs (user applications) were created to assist users in interacting with computing devices in order to achieve a certain goal. For instance, a word processor can provide a user with the ability to read and interact with information the user is entering into an electronic document, using one or more peripheral devices (e.g., keyboard and/or a pointing device). For example, a user could be drafting a document and determine that a portion of the information recorded in the document must be moved from its current location and placed in another location within the document. The user may also determine that the information needs to be added to another word processor document, or another user application that is not a word processor. In any of the events presented above, the user can enter a command using a peripheral device that corresponds to removing (i.e., cutting) the designated information, and placing (i.e., pasting) or entering the designated information into another document, or another computer program. The cutting and pasting operations require the operating system to move data associated with the designated information from one place in the computer's hardware (i.e., memory) to another place in the computer's hardware. These operations, as well as other operations performed by other user applications can cause the user application to respond slowly, and in some instances stop working altogether (i.e., crash). If user applications are installed on a standalone desktop or laptop computer owned by the user, they can simply restart the user application, or restart the computer, and the issues are usually resolved. If, however, the user applications are stored on a server (physical or virtual) hosted by a third-party, the user might not be able to restart the application, and they cannot restart the server. As a result the owner, or operators, of the server may have to diagnose the problem in order to resolve the issues with the application.

Currently, network administrators who are responsible for the maintenance and daily operations of user application services hosted on enterprise networks have only one way of fixing or updating user applications. The network administrators have to log into the servers on the enterprise network hosting the user applications, with restricted access to certain features of the user applications. When the network administrator logs into the server, the server can begin to operate in maintenance mode. This mode can be activated by a network administrator in order to perform updates, or to fix user applications that are experiencing problems. While the network administrator is logged into the server in maintenance mode, users are prevented from logging into a server hosting a user application that the user needs to use, so the enterprise network will log the user into another server (i.e., load balance the user to another server). However, the enterprise network does not distinguish between network administrator connections and normal user connections, so it also prevents network administrators from logging into the server to perform maintenance and/or troubleshoot issues with user applications. In order to work around this problem, network administrators often modify the server's load balancer or remove servers from worker groups (groups of servers hosting user applications). This approach prevents network administrators from logging into the problematic server and/or launching the problematic user application. To solve this problem, network administrators frequently publish extra copies of user applications to specific servers, and assign the extra copies only to network administrators and selected test users.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The systems and methods disclosed herein integrate the process of removing one or more servers from load balancing and publishing extra user applications in an isolated directory accessible only to network administrators and selected users thereby enabling them to troubleshoot a problematic user application or virtual desktop that users are experiencing problems with.

The embodiments described in the current disclosure provide the ability to fully utilize computing device applications (e.g., Microsoft Word) and computing device desktop environments (e.g., Red Hat operating system) by presenting hardware and software solutions that govern the interaction between an operating system running on a user's computing device, and hardware and software running on one or more servers.

Figure 1:
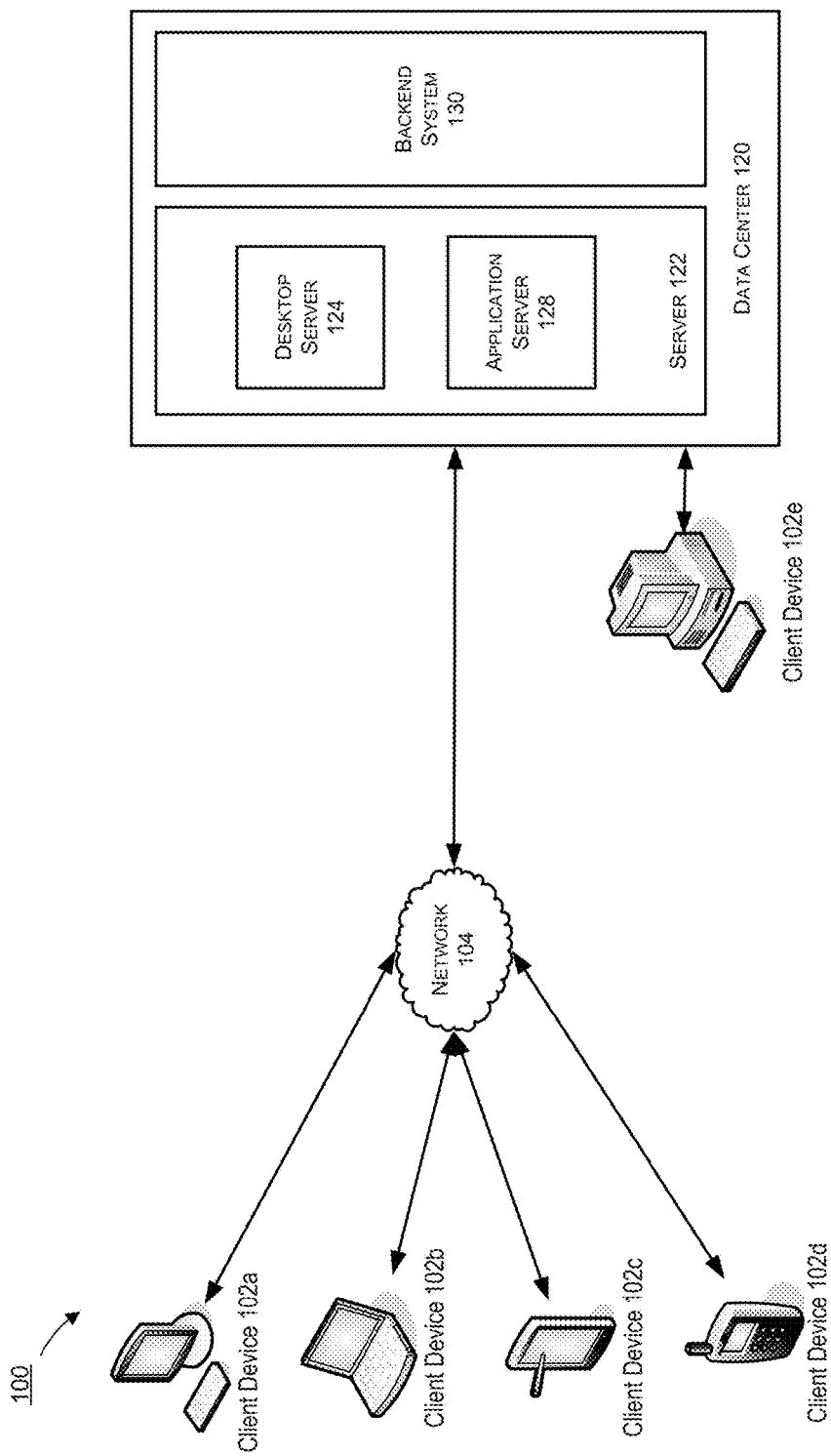
FIG. 1 is a block diagram of an exemplary network environment, consistent with embodiments of the present disclosure.

FIG. 1 is a block diagram of an exemplary network environment 100. While network environment 100 is directed to a virtual network environment, it is appreciated that network environment 100 can be any type of network that communicates using packets. Network environment 100 can include one or more client devices 102, network 104, and a data center 120.

Data center 120 can comprise one or more memories and central processing units (CPUs). The CPUs can be comprised of logic circuitry that responds to and processes instructions fetched from the one or more memories. The CPUs can comprise one or more processors, field-programmable gate arrays (FPGAs), or digital signal processors (DSPs) capable of executing particular sets of instructions stored in the one or more memories. The instructions can also be stored in one or more caches. The one or more memories can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), caches, registers, or a semiconductor memory. The one or more memories can be any type of random access memory (RAM), or any other available memory chip capable of operating as described herein.

One or more client devices 102 are devices that can acquire remote services from data center 120 through various means. Client devices 102 can communicate with data center 120 either directly (e.g., client device 102e) or indirectly through network 104 (e.g., client devices 102a-d). In some embodiments network 104 can be a private network, and in other embodiments network 104 can be a public network. While client devices 102 are portrayed as desktop computers (e.g., client devices 102a and 102e), a laptop (e.g., client device 102b), a tablet (e.g., client device 102c), and a mobile smart phone (e.g., client device 102d), it is appreciated that client devices 102 could be any type of device (e.g., smart watch) that can send and receive signals directly or indirectly to and from data center 120.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122) and a backend system 130. In some embodiments, data center 120 can include a gateway, an appliance, or a combination of both.

Server 122 is an entity that can be represented by any electronic addressable format, and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications hosted on application server 128 to one or more endpoints (e.g., client devices 102a-e). For example, application server 128 can include Windows™ based applications and computing resources. Another service that server 122 can include involves providing one or more virtual desktops hosted on desktop server 124 to one or more endpoints. For example, desktop server 124 can include virtualized operating systems (e.g., Windows™) that provide the same functionality as a locally installed version of the operating system.

Desktop server 124 can include hosted shared desktops allowing multiple users to access a single shared Remote Desktop Services desktop, virtual desktop infrastructure desktops allowing each user to have their own virtual machine, streaming disk images, a local virtual machine, individual applications (e.g., one or more applications), or a combination thereof.

Backend system 130 can comprise single or multiple instances of computer networking hardware, appliances, or servers in a server farm or a bank of servers and interfaces directly or indirectly with data center 120. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102.

Figure 2A:
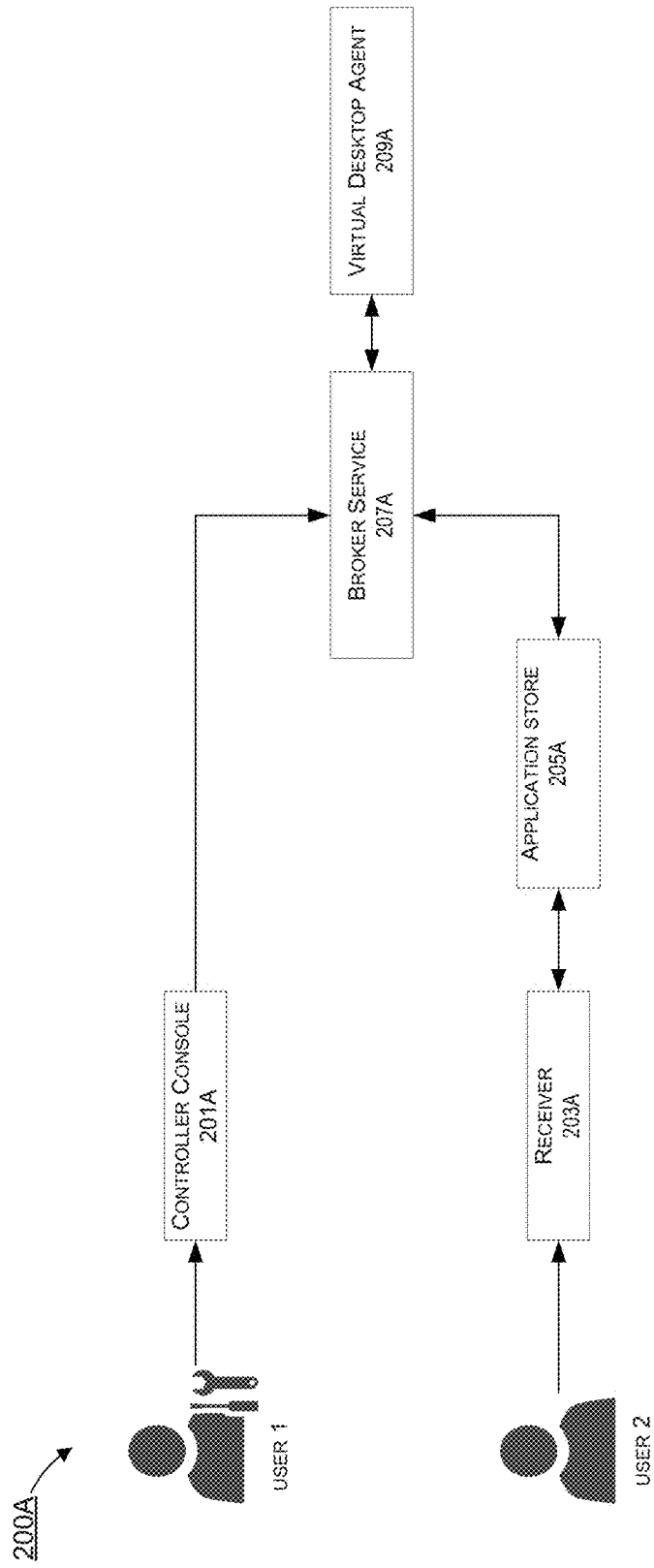
FIGS. 2A-2B are block diagrams of an exemplary network environment, consistent with embodiments of the present disclosure.

FIG. 2A is a block diagram of an exemplary network environment 200A. Network environment 200A comprises software that can be used to provide one or more users (e.g., user 1, user 2) with the ability to interact with applications hosted on application server 128 and/or virtual desktops hosted on desktop server 124. The users can interact with the applications and virtual desktops using client devices 102.

In some embodiments, the components of network environment 200A can be installed on a single computing device, and in other embodiments the components can be installed on more than one computing device. For example, controller console 201A, broker service 207A, and virtual desktop agent 209A can all be installed on a standalone computing device (e.g., client device 102e) that interacts directly with desktop server 124 and application server 128 through server 122. The user interacting with these two servers can be a network administrator. In some embodiments, the user can be a user identified by a network administrator who has been given special permission to interact with the components of server 122 (i.e., application server 128 and/or desktop server 124). In other embodiments, these components can be spread across multiple computing devices. For example, controller console 201A can be installed on client device 102e, broker service 207A can be installed on server 122, and virtual desktop agent 209A can be installed on server 122.

Controller console 201A can be a user interface that an administrator (e.g., user 1) can use to interact with application server 128 and/or desktop server 124. Controller console 201A can interact with application server 128 and/or desktop server 124 via a delivery controller (e.g., delivery controller 310 of FIG. 3). Controller console 201A is a graphical user interface that can provide an administrator with the ability to modify certain parameters on desktop server 124 and application server 128.

Broker service 207A can be a software and/or hardware component of network environment 200A that can broker a connection between a user device (e.g., client device) and one or more applications hosted on application server 128 and/or virtual desktops hosted on desktop server 124. Broker service 207A can determine whether or not a client device can be connected to an application or virtual desktop based on the number of existing connections established with the applications or virtual desktops the user's device is attempting to establish a connection with. Broker service 207A can be a service offered on a delivery controller.

Virtual desktop agent 209A can be a set of drivers and services that are installed on a host machine that a client device attempts to connect to.

Receiver 203A can be a software client that provides delivery of virtual desktops and applications. Receiver 203A can be installed on a client device (e.g., client devices 102a-e). Receiver 203A can provide self-service access to virtual desktops, applications, and Information Technology services. Receiver 203A can be software, firmware, hardware, or some combination that provides a user's device with the ability to display the contents of one or more applications hosted on application server 128 or one or more virtual desktops hosted on desktop server 124. Returning to the example of a user who is handwriting a digital document, if the user attempts to access an application that can transcribe hand written information into standard text, the user's device can access an application hosted on application server 128 or installed on desktop server 124 providing this feature. If the application is hosted on application server 128 or installed on desktop server 124, the servers can send the application to the user's device or can send and receive messages between the user's device and the application installed on the servers. In some embodiments, the application can be sent directly to the user device and the user can use the application locally. In other embodiments, the application is hosted on the servers, and when a user wants to execute an operation, the user can enter the commands on their device and receiver 203A can send a signal to the application residing on the server. The server can then execute the command and return a result to the user device.

Application store 205A provides a network administrator with the ability to create an enterprise application store that aggregates resources from desktop server 124 and application server 128. Application store 205A can provide a user with access to virtual desktops and applications, mobile applications, external software-as-a-service (SaaS) applications, and internal web applications through a single portal from one or more devices associated with the user. For example, a user might begin working on a Microsoft Word document on a tablet, and at some time in the future can access the same document using a desktop computer. Application store 205A provides a network administrator with the ability to manage the provisioning of corporate desktops and applications for the users connected to an enterprise network. Consolidating the delivery of resources through application store 205A can provide a network administrator with the ability to manage multiple delivery mechanisms for different applications, and/or provide support for manual installations and updates.

When a client device (e.g., of user 2) accesses an application hosted on application server 128 or a virtual desktop hosted on desktop server 124, the user's device (client device) can be logged into receiver 203A, which in turn connects the client device to application store 205A. After the client device has been logged into application store 205A, broker service 207A can determine if the application or virtual desktop that the user is requesting is available on virtual desktop agent 209A. Broker service 207A assesses the number of connections associated with the requested application and/or virtual desktop the user is requesting. If there are no connections available to connect the client device to the requested application and/or virtual desktop, then broker service 207A can search for the same application and/or virtual desktop hosted on another server and attempt to connect the client device to the application and/or virtual desktop hosted on the alternative server. After an application and/or virtual desktop has been located that has connections available, virtual desktop agent 209A can establish a connection with receiver 203A, and the client device can begin exchanging information with the requested application and/or virtual desktop. The process of searching for available connections is commonly referred to as load balancing.

In some embodiments, an administrator can perform maintenance on one or more applications hosted on application server 128 or virtual desktops hosted on desktop server 124, and by placing the server in a maintenance mode. As a result, users requesting access to an application or virtual desktop can be denied access.

If a server is operating in maintenance mode, a client device that is attempting to access an application or virtual desktop on application server 128 or desktop server 124 can establish a connection with a duplicate copy of the application or virtual desktop that the client device was attempting to establish a connection with. As a result, the client device will not be load balanced.

Figure 2B:
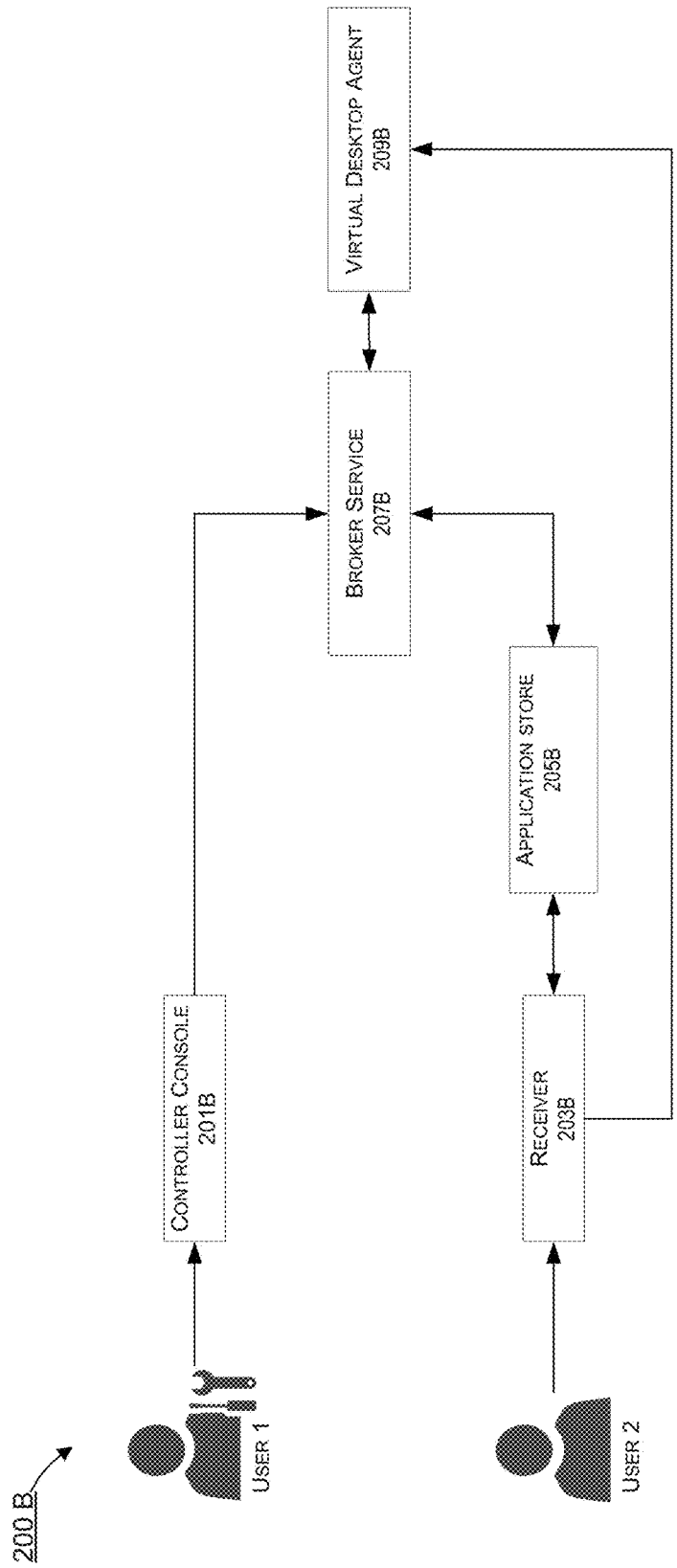

The client device can go through a similar process to the one described above with respect to network environment 200A, but can use the network environment shown in FIG. 2B instead. If application server 128 or desktop server 124 is in maintenance mode, then virtual desktop agent 209B can send a signal to receiver 203B indicating that the corresponding server that virtual desktop agent 209B is associated with is in maintenance mode. Broker service 207B can send a signal to receiver 203B indicating one or more directories that that receiver 203B can connect to that contain duplicates of applications and/or virtual desktops that receiver 203B is currently connected to or attempting to connect to. After receiver 203B receives the signal, receiver 203B can connect the user's device to the duplicate applications and/or virtual desktops, so that the user can continue using the application or virtual desktop while a network administrator performs maintenance on the server. The duplicate application(s) or virtual desktop(s) can be exact replicas of the applications that receiver 203B was connected to prior to the servers being placed in maintenance mode.

Figure 3:
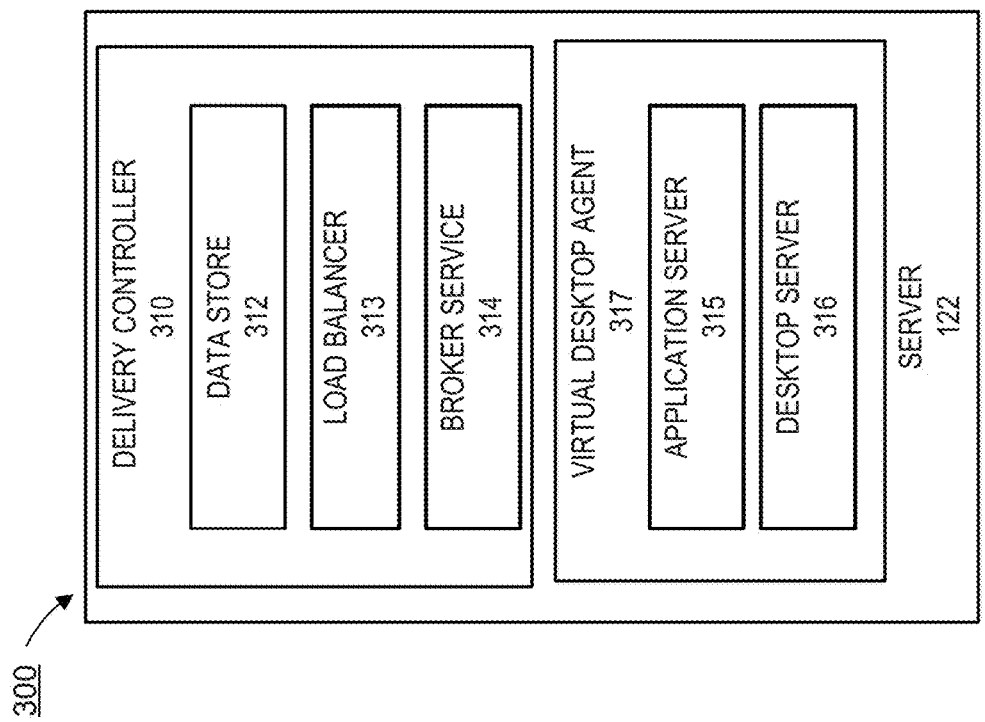
FIG. 3 is a block diagram of an exemplary server, consistent with embodiments of the present disclosure.

FIG. 3 is a block diagram of an exemplary server, consistent with embodiments of the present disclosure. Server 122 can be a physical server or a virtual server. Server 122 can be a combination of hardware, software, and/or firmware. Server 122 can comprise among other things a delivery controller (e.g., delivery controller 310), comprising a data store (e.g., data store 312), load balancer (e.g., load balancer 313), broker service (e.g., broker service 314), application server (e.g., application server 315), and desktop server (e.g., desktop server 316). Delivery controller 310 can be a network device that manages client connections to Web and enterprise applications. In general, delivery controller 310 can be a hardware device or a software program that manages or directs the flow of data between two entities. For instance, delivery controller 310 can manage or direct the flow of data between a client device and an application stored on application server 315. Delivery controller 310 can optimize end-user performance, reliability, data center resource use, and security for enterprise applications. In some embodiments, delivery controller 310 can strategically be placed behind a firewall (not shown) and in front of one or more application servers to be a single point of control that can determine the security needs of an application and provide simplified Authentication, Authorization and Accounting (AAA).

Delivery controller 310 can accelerate the performance of applications delivered over network 104 by implementing optimization techniques such as compression and reverse caching. With reverse caching, new user requests for static or dynamic Web objects can often be delivered from a cache in delivery controller 310 rather than having to be regenerated by the servers.

In some embodiments, delivery controller 310 can be a virtual delivery controller. A virtual delivery controller is particularly useful in virtualized data centers and cloud computing environments where users need to be able to scale capacity up and down as application demand fluctuates.

Application server 315 can be a physical or virtual server containing one or more virtual applications (e.g., Microsoft Office Suite™) that a client device can be connected to via delivery controller 310.

Desktop server 316 can be a physical or virtual server containing one or more virtual desktops (e.g., Microsoft Vista™) that a client device can be connected to via delivery controller 310.

Virtual desktop agent 317 can comprise application server 315 and desktop server 316.

Data store 312 can be a database that contains information about one or more servers (e.g., application servers) that are part of a server farm (not shown). A server farm is a collection of servers either physical or virtual that have been grouped together logically based on a predetermined set of rules. For example, each server in the server farm might only include mobile applications that can be executed on mobile phones, tablets, and personal data assistants (PDAs). Therefore the server farm could be called a mobile application server farm.

Data store 312 can contain configuration information for application server 315. In some embodiments, application server 315 can be a server farm, and data store 312 can contain configuration information for each server in the server farm.

Delivery controller 310 can assist desktop server 316 in delivering one or more virtual desktops to client devices. Delivery controller 310 can help a network administrator manage, maintain, and optimize all virtual desktop connections. Delivery controller 310 can provide a network administrator with the ability to perform dynamic pooling, on-demand assignment, and pre-assignment of virtual desktops to client devices, based on appropriate policies, roles, or other criteria. Delivery controller 310 manages the virtual desktops and sessions running on them. It can also broker connection requests from client devices and manage licensing. If desktop server 316 is part of a server farm, delivery controller 310 can manage a data store that contains persistent configuration information for the server farm.

Broker service 314 can encompass the same components and features as broker services 207A and 207B.

Load balancer 313 can distribute connections from client devices among servers hosting the same application content. By balancing application requests across multiple servers, load balancer 313 can prevent any desktop server from becoming a single point of failure, thus improving overall application availability and responsiveness. For example, when one desktop server becomes unavailable, load balancer 313 can direct new application requests to other available servers.

Load balancer 313 can also improve server utilization and maximize availability. Load balancing can assist network administrator with scaling out an application server infrastructure. As application demand increases, new servers can be added to the resource pool and load balancer 313 can immediately begin sending traffic to the new server.

Load balancer 313 can comprise a set of rules that determine a particular server's "score", or current load value. The score can be used to determine how the connections to applications on application server 315 can be distributed amongst the applications hosted on application server 315. If there are multiple application servers, instead of one application server, the score can be used to determine how the connections to applications can be distributed amongst the servers within the server farm. The score can be determined by the number of current Independent Computing Architecture (ICA) sessions (connections) running on an application server. For example, a maximum value of 100 connections means that an application server can only support 100 connections. As a result 100 client devices can be supported by the application server. Load evaluators can factor resource utilization, such as processor and memory utilization into the score value as well.

Another situation in which a user might not gain access to a requested application and/or desktop is when application server 315 and desktop server 316 are put into maintenance mode. In such a situation, broker service 314 can deny a client device from connecting to an application or virtual desktop before assessing whether or not there are connections available to connect the client device to application server 315 or desktop server 316.

Figure 4:
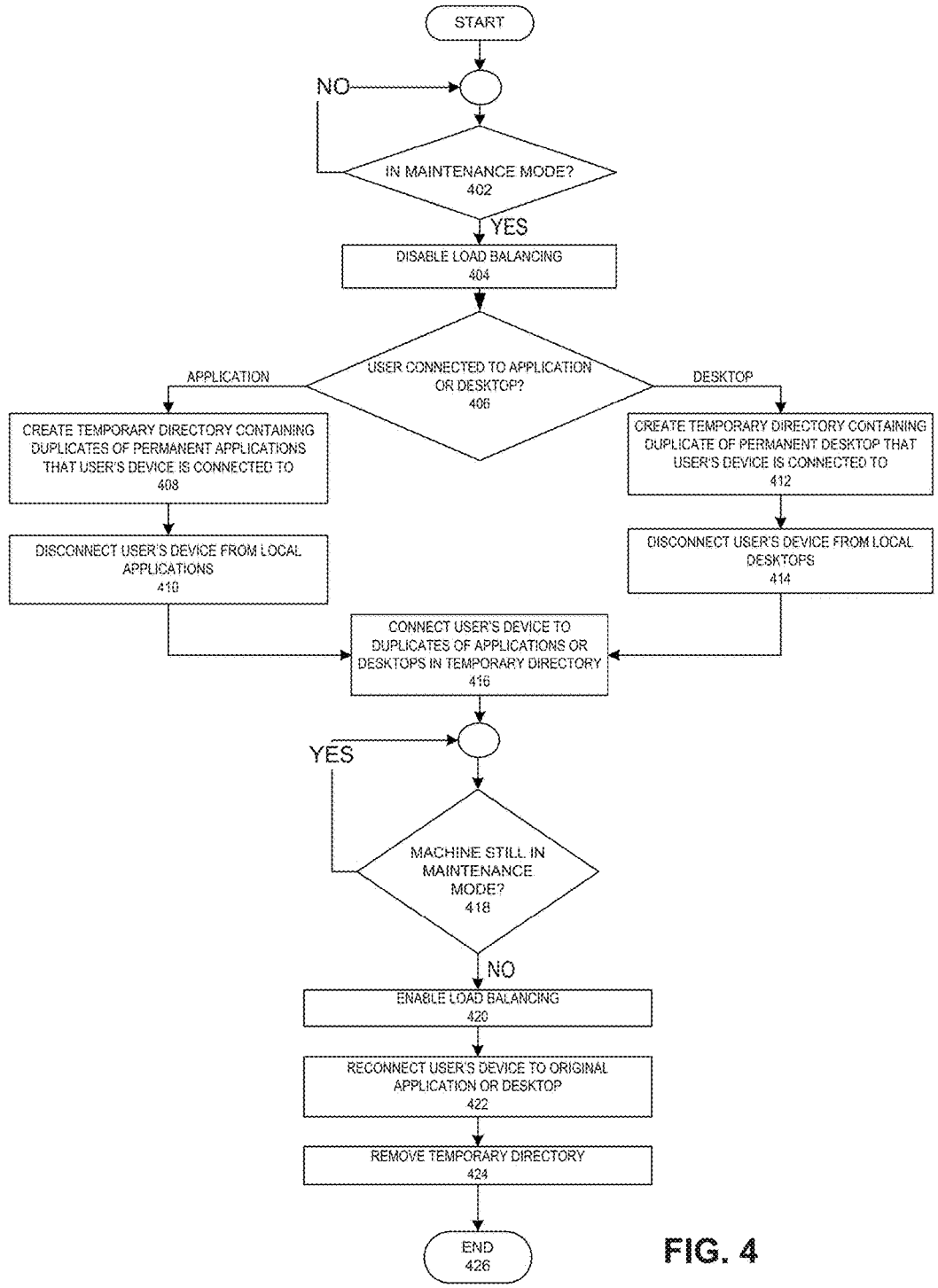
FIG. 4 is a flowchart representing exemplary methods for connecting devices to applications and desktops that are receiving maintenance.

FIG. 4. is a flowchart representing exemplary methods for connecting devices to applications and desktops that are receiving maintenance. It will be readily appreciated that the illustrated procedure can be altered to delete steps or further include additional steps. While the following description is directed to the method being performed by a desktop server (e.g., desktop server 124) and/or an application server (e.g., application server 128), it is appreciated that the method can be performed in whole or in part by a device other than these two servers (e.g., server 122 or data center 120). The exemplary methods described herein for connecting a client device to an application server or desktop server that is in maintenance can provide a user of a client device with the ability to continue using an application or virtual desktop while a network administrator performs maintenance on the servers.

After initial start step, the server can determine whether the server is in maintenance mode or not. The server can be placed into maintenance mode by a network administrator. If the server determines that it is not in maintenance mode, the server can return to step 402 to determine if it is has been placed in maintenance mode.

If the server determines that it is in maintenance mode, the server can disable load balancing in step 404.

After load balancing is disabled in step 404, the server can create application and desktop test user groups in step 406. A test user group can be a group of users who have been given permission to test (use) applications or virtual desktops while they are receiving maintenance. In some embodiments, this group can be determined by an administrator. For example, an administrator can determine which users to include in the test user group based on the application that is receiving maintenance. In other embodiments, the group of test users can be determined by an application that is experiencing complications or issues. For example, if an application has a slow response time or continuously shuts down when a user is using it, then a network administrator might include one or more client devices associated with a user using the application to the test user group. In other embodiments, the server or a server component can add a client device to a test group without consultation from the network administrator. For example, if a virtual desktop agent (e.g., virtual desktop agent 209A) determines that several client devices are unable to connect to an application or virtual desktop or that the client devices continuously disconnect from the application or virtual desktop, then a delivery controller (e.g., delivery controller 310) can create a test user group. In some embodiments, the delivery controller can determine when application or virtual desktop irregularities are occurring. The delivery controller can use information generated by a load balancer to determine if an application or desktop is experiencing issues. For example, if the load experienced by a server begins to fluctuate with a certain frequency, the delivery controller can determine if the fluctuation is due to an application or virtual desktop that is experiencing problems. One way in which the delivery controller can determine if there are issues with an application or desktop is to determine the rate at which applications and/or virtual desktops shut down or experience intermittent issues. The delivery controller can use the Mean Time Between Failure (MTBF), to determine if the applications and/or desktops are experiencing problems. For example, if the rate (frequency or period) at which an application or virtual desktop experiences problems exceeds the MTBF, then the delivery controller can assign the client devices associated with the failures to a test user group.

After the test user groups have been created, the server can create one or more directories containing duplicates of the applications and/or virtual desktops for the users in the test user groups in steps 408 and 412, respectively. A directory of the duplicate applications and desktops can be created by the delivery controller. In some embodiments, the directories can be stored on the same server as the delivery controller. In other embodiments the directories can be stored on another server.

In some embodiments, the test users in the application test user group can be the same as the test users in the desktop test user group, and vice versa.

After the directories have been created, the user's device (e.g., client device 102c) can disconnect itself from the application that it is connected to in step 410, and/or the virtual desktop that the user's device is connected to in step 414 in response to a user input to disconnect the user's device from the applications and/or virtual desktops.

In some embodiments a delivery controller can disconnect a user's device (e.g., client device 102c) from the application that the user's device is connected to in step 410, and/or the virtual desktop that the user's device is connected to in step 414.

The delivery controller can reconnect the client devices, associated with the users in the test user group, to the duplicate copies of the applications and virtual desktops stored in the directories (416). After the client devices have been connected to the duplicate applications and virtual desktops, the server can determine if it is still in maintenance mode (418). The server can exit maintenance mode after the network administrator or server has resolved the issues associated with problematic applications and/or virtual desktops. In some embodiments, the issues associated with the applications or virtual desktops can be resolved by the delivery controller resetting parameters within the application server and/or desktop server.

If it is still in maintenance mode, the server can continue to check if it is in maintenance mode until it is no longer in maintenance mode after which the server can proceed to re-enabling load balancing in step 420.

After load balancing has been re-enabled, the user's device can reconnect itself to the applications and/or virtual desktops that it was originally connected to before the server entered maintenance mode in step 422 in response to an input from a user to reconnect the user's device to the applications and/or virtual desktops. After the client devices have been reconnected to the original applications and/or virtual desktops, the server can remove the temporary directory in step 424.

In some embodiments steps 422 and 424 can be performed by the delivery controller. After the temporary directory has been removed, the method can proceed to end (426).

The methods disclosed herein can be implemented as a computer program product comprising computer-readable instructions. Computer-readable instructions can be stored on a tangible non-transitory computer-readable medium, such as a flexible disk, a hard disk, a CD-ROM (compact disk-read only memory), an MO (magneto-optical) disk, a DVD-ROM (digital versatile disk-read only memory), a DVD RAM (digital versatile disk-random access memory), RAM, a cache, a register, or a semiconductor memory. The computer-readable instructions can be stored on a combination of client devices (e.g., client devices 102a-e) and/or a data center (e.g., data center 120), and can be used to implement controller console 201A, receiver 203A, application store 205A, broker service 207A, and virtual desktop agent 209A on the client devices and/or data center. The computer-readable instructions can be used to implement the steps of determining whether a server is in maintenance mode (steps 402 and 418), disabling load balancing (step 404), determining step 406, creating temporary directories containing duplicate applications or desktops (steps 408 and 412), disconnecting a user's computing device from local applications or desktops that it is connected to (steps 410 and 414), connecting the user's computing device to the duplicate applications or desktops (step 416), re-enabling load balancing (step 420), reconnecting the user's computing device to the local applications and/or desktops that it was originally connected to (step 422), and removal step 424 in FIG. 4.

Alternatively, the methods can be implemented in hardware components or combinations of hardware and software of a data processing apparatus, e.g., a programmable processor, a computer, or multiple computers. The hardware components and/or combinations of hardware and software components of the data processing apparatus can be included in client devices (e.g., client devices 102a-e), and/or a data center (e.g., data center 120). A computer program can be written in any form of programming language, including compiled or interpreted languages, and it can be deployed in any form, including as a standalone program or as a module, component, subroutine, or other unit suitable for use in a computing environment. The programmable processor, computer, or multiple computers can be used to execute a program that performs the steps of determining whether a server is in maintenance mode (steps 402 and 418, disabling load balancing (step 404), determining step 406, creating temporary directories containing duplicate applications or desktops (steps 408 and 412), disconnecting a user's computing device from local applications or desktops that it is connected to (steps 410 and 414), connecting the user's computing device to the duplicate applications or desktops (step 416), re-enabling load balancing (step 420), and reconnecting the user's computing device to the local applications and/or desktops that it was originally connected to (step 422), and removal step 424 in FIG. 4.

The computer program can be deployed to be executed on one computer or on multiple computers at one site or distributed across multiple sites and interconnected by a communication network as illustrated in FIG. 1.

In the preceding specification, the embodiments have been described with reference to specific exemplary embodiments. It will however, be evident that various modifications and changes can be made without departing from the broader spirit and scope of the exemplary embodiments as set forth in the claims that follow. The specification and drawings are accordingly to be regarded as illustrative rather than restrictive. Other embodiments of the present disclosure may be apparent to those skilled in the art from consideration of the specification and practice of the invention disclosed herein.

What is claimed:
1. A server comprising:
a processor; and
memory storing computer readable instructions that, when executed by the processor configure the server to:
establish one or more connections between one or more client devices and one or more applications hosted or installed on the server and determine a number of connections being serviced;
provide, to one or more client devices, a connection to one or more installed applications or to one or more virtual desktops hosted on the server;
determine that the one or more installed applications or the one or more virtual desktops hosted are experiencing issues and responsive to the determination the server is placed in maintenance mode;
in response to the server determining that the server has been placed into maintenance mode, the server configured to:
create a user group of users with permission to use the one or more installed applications or the one more virtual desktop while in maintenance mode;
create one or more directories comprising duplicates of the one or more applications or the one or more virtual desktops for users of the user group to use via the one or more client device,
disconnect the one or more client devices from the one or more installed applications or one or more virtual desktops hosted on the server, and
connect the one or more client devices to the one or more duplicate applications or one or more duplicate virtual desktops: and
in response to the server being taken out of maintenance mode:
reconnect the one or more client devices to the one or more installed applications or one or more virtual desktops hosted on the server; and
remove the one or more directories.

2. The server of claim 1, wherein the client devices are administrator devices and/or test user devices.

3. The server according to claim 1, wherein the delivery controller is configured to determine whether to accept additional connections to one or more applications hosted on the server if the load balancer determines that the number of connections being serviced by the server exceeds a predetermined number.

4. The server of claim 1, further comprising a delivery controller configured to establish connections between the one or more client devices and the one or more virtual desktops hosted on the server.

5. The server of claim 1, further comprising a load balancer configured to determine the number of connections being serviced by the server.

6. The server according to claim 5, wherein the delivery controller is configured to determine whether to accept additional connections to one or more virtual desktops hosted on the server if the load balancer determines that the number of connections being serviced by the server exceeds a predetermined number.

7. A method performed by a server configured to disconnect a client device from one or more installed applications or one or more virtual desktops hosted on the server, while the server is in maintenance mode, the method comprising:
establishing one or more connections between one or more client devices and one or more applications hosted or installed on the server and determine a number of connections being serviced
providing, to one or more client devices, a connection to the one or more installed applications or to the one or more virtual desktops hosted on the server;
determine that the one or more installed applications or the one or more virtual desktops hosted are experiencing issues and responsive to the determination the server is placed in maintenance mode;
in response to the server determining that the server has been placed into maintenance mode, the server configured to:
create a user group of users with permission to use the one or more installed applications or the one more virtual desktop while in maintenance mode
creating one or more directories comprising duplicates of the one or more installed applications or the one or more virtual desktops hosted on the server for users of the user group to use, and
disconnecting the one or more client devices from the one or more installed applications or the one or more virtual desktops hosted on the server, and
connecting the one or more client devices to the one or more duplicate applications or the one or more virtual desktops; and
in response to the server being taken out of maintenance mode:
reconnecting the one or more client devices to the one or more installed applications or one or more virtual desktops hosted on the server; and
remove the one or more directories.

8. The method of claim 7, wherein the client devices are administrator devices and/or test user devices.

9. The method of claim 7, further comprising receiving an input to place the server in maintenance mode if one or more of the installed applications have irregular response times.

10. The method of claim 7, further comprising receiving an input to place the server in maintenance mode if one or more of the installed applications shuts down.

11. The method of claim 7, further comprising receiving an input to place the server in maintenance mode if one or more of the installed virtual desktops have irregular response times.

12. The method of claim 7, further comprising receiving an input from a user to place the server in maintenance mode if one or more of the installed virtual desktops shuts down.

13. The method of claim 9, wherein receiving the input to place the server in maintenance mode occurs if the response times have a Mean Time Between Failure distribution.

14. The method of claim 11, wherein receiving the input to place the server in maintenance mode if the response times have a Mean Time Between Failure distribution.

15. A non-transitory computer-readable storage medium storing a set of instructions that is executable by at least one processor of a server to cause the server to perform a method comprising:
establishing one or more connections between one or more client devices and one or more applications hosted or installed on the server and determine a number of connections being serviced
providing, to one or more client devices, a connection to one or more installed applications or to one or more virtual desktops hosted on the server,
determine that the one or more installed applications or the one or more virtual desktops hosted are experiencing issues and responsive to the determination the server is placed in maintenance mode;
in response to the server determining that the server has been placed into maintenance mode, the server configured to:
create a user group of users with permission to use the one or more installed applications or the one more virtual desktop while in maintenance mode creating one or more directories comprising duplicates of the one or more installed applications or the one or more virtual desktops hosted on the server for users of the user group to use and disconnecting the one or more client devices from the one or more installed applications or the one or more virtual desktops hosted on the server, and connecting the one or more client devices to the one or more duplicate applications or the one or more virtual desktops; and in response to the server being taken out of maintenance mode:

reconnecting the one or more client devices to the one or more installed applications or one or more virtual desktops hosted on the server; and remove the one or more directories.

16. The computer readable storage medium of claim 15, wherein the client devices are administrator devices and/or test user devices.

17. The computer readable storage medium of claim 15, wherein the set of instructions that is executable by the at least one processor of the server cause the server to further perform:

determining that the server should he placed in maintenance mode if one or more of the installed applications have irregular response times.

18. The computer readable storage medium of claim 15, wherein the set of instructions that is executable by the at least one processor of the server cause the server to further perform:

determining that the server should he placed in maintenance mode if one or more of the installed applications shuts down.

19. The computer readable storage medium of claim 15, wherein the set of instructions that is executable by the at least one processor of the server cause the server to further perform:

determining that the server should he placed in maintenance mode if one or more of the installed virtual desktops have irregular response times.

20. The computer readable storage medium of claim 15, wherein the set of instructions that is executable by the at least one processor of the server cause the server to further perform:

determining that the server should he placed in maintenance mode if one or more of the installed virtual desktops shuts down.

21. The computer readable storage medium of claim 17, wherein the set of instructions that is executable by the at least one processor of the server cause the server to further perform:

placing the server in maintenance mode if the response times have a Mean Time Between Failure distribution.

22. The computer readable storage medium of claim 21, wherein the set of instructions that is executable by the at least one processor of the server cause the server to further perform:

placing the server in maintenance mode if the response times have a Mean Time Between Failure distribution.

23. The computer readable storage medium of claim 15, wherein the set of instructions that is executable by the at least one processor of the server cause the server to further perform:

determining whether to accept additional connections to one or more virtual desktops hosted on the server if the number of connections being serviced by the server exceeds a predetermined number.

24. The computer readable storage medium of claim 15, wherein the set of instructions that is executable by the at least one processor of the server cause the server to further perform:

determining whether to accept additional connections to one or more applications hosted on the server if the number of connections being serviced by the server exceeds a predetermined number.

25. The server of claim 1, wherein the memory stores instructions that, when executed by the processor, cause the server to in response to the server being placed into maintenance mode:

disable load balancing on the server.

26. The server of claim 25, wherein the memory stores instructions that, when executed by the processor, cause the server to in response to the server being taken out of maintenance mode:

enable load balancing on the server.

* * * * *